US007715612B2

(12) United States Patent
Shiratsuchi et al.

(10) Patent No.: US 7,715,612 B2
(45) Date of Patent: May 11, 2010

(54) DISCRIMINATING APPARATUS

(75) Inventors: Masataka Shiratsuchi, Kawasaki (JP); Hiromichi Hayashihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1305 days.

(21) Appl. No.: 11/202,337

(22) Filed: Aug. 12, 2005

(65) Prior Publication Data

US 2006/0044579 A1 Mar. 2, 2006

(30) Foreign Application Priority Data

Aug. 30, 2004 (JP) ............................ 2004-250463

(51) Int. Cl.
*G06K 9/00* (2006.01)
*G06K 9/74* (2006.01)

(52) U.S. Cl. ........................................ 382/135; 356/71

(58) Field of Classification Search ....................... None
See application file for complete search history.

(56) References Cited

U.S. PATENT DOCUMENTS

| | | | | |
|---|---|---|---|---|
| 3,922,557 | A | 11/1975 | Carnes, Jr. | |
| 4,319,137 | A | 3/1982 | Nakamura et al. | |
| 4,618,257 | A | 10/1986 | Bayne et al. | |
| 4,973,851 | A | 11/1990 | Lee | |
| 5,666,417 | A | 9/1997 | Liang et al. | |
| 5,822,448 | A | 10/1998 | Graves et al. | |
| 2005/0286751 | A1 * | 12/2005 | Mizoi | 382/135 |
| 2008/0220707 | A1 * | 9/2008 | Jones et al. | 453/2 |

FOREIGN PATENT DOCUMENTS

| | | | |
|---|---|---|---|
| CN | 1429379 | A | 7/2003 |
| CN | 1492381 | A | 4/2004 |
| GB | 2 311 130 | A | 9/1997 |
| JP | 11-3448 | | 1/1999 |
| JP | 2003-323656 | | 11/2003 |

* cited by examiner

*Primary Examiner*—Charles Kim
(74) *Attorney, Agent, or Firm*—Oblon, Spivak, McClelland, Maier & Neustadt, L.L.P.

(57) ABSTRACT

In a discriminating apparatus, a substrate portion of printed matter is irradiated with a light beam emitted from a light source, and the intensity of the light beam reflected from the substrate is detected by a photodetector. The discrimination as to whether the printed matter is the original or a reproduction is performed by a discriminating unit based on the contrast value in the intensity of the reflected light detected by the photodetector. Thus, the discriminating apparatus discriminates whether the printed matter is the original or a reproduction at high speed and also permits lowering the possibility of an erroneous discrimination.

18 Claims, 9 Drawing Sheets

| MTF (%) | Spacial frequency (lines / mm) ±0.5mm | Minimum spot diameter ($\mu$m) |
|---|---|---|
| 9 | 74 | 6.75 |
| 10 | 71 | 7.42 |
| 20 | 46 | 10.86 |

| | Original | Reproduction |
|---|---|---|
| Data1 | 0.66667 | 0.81962 |
| Data2 | 0.65882 | 0.84706 |
| Data3 | 0.64314 | 0.85490 |
| Data4 | 0.63529 | 0.83137 |
| Data5 | 0.64314 | 0.81569 |
| Data6 | 0.66275 | 0.81961 |
| Data7 | 0.65882 | 0.82745 |
| Contrast value | 0.02410 | 0.23474 |

DISCRIMINATING APPARATUS

CROSS-REFERENCE TO RELATED APPLICATIONS

This application is based upon and claims the benefit of priority from prior Japanese Patent Application No. 2004-250463, filed Aug. 30, 2004, the entire contents of which are incorporated herein by reference.

BACKGROUND OF THE INVENTION

1. Field of the Invention

The present invention relates to a discriminating apparatus for discriminating whether printed matter is an original or a reproduction, particularly, to a discriminating apparatus for discriminating a reproduction obtained by using a base material differing from an original in the color of the base material of the printed matter.

2. Description of the Related Art

In recent years, a color scanner or a color printer that is connected to a digital color copying machine or a computer has been widely propagated so as to make it possible to easily obtain a reproduction of printed matter. Also, the performance of these copying machine, color scanner and color printer has been prominently improved so as to make it difficult to discriminate between an original and a reproduction of printed matter. Under the circumstances, research is being conducted in an attempt to develop a discriminating apparatus for discriminating between an original and a reproduction of printed matter.

The conventional discriminating apparatus for discriminating between an original and a reproduction of printed matter utilizes in general the difference in the printing system between the two. To be more specific, the original of printed matter, e.g., authentic securities certificate, is printed in general by a relief press. On the other hand, a reproduction obtained by a copying machine or a printer is printed by dots of cyan (C), yellow (Y), magenta (M), black (K), etc. Generally, an authentic securities certificate has a high density region in which the substrate surface (non-printing region) and a printed surface (printing region) are arranged at a high density. If that high density region on the authentic securities certificate is irradiated with a light beam, a brightness pattern having large amplitude conforming to the printing pattern is generated in the light beam passing through or reflected from the particular high density region. However, if the corresponding region on a reproduction of the securities certificate is irradiated with the light beam, the amplitude of the brightness pattern of the light beam passing through or reflected from the particular high density region is diminished. Such being the situation, in the conventional discriminating apparatus as disclosed in, for example, Japanese Patent Disclosure (Kokai) No. 2003-323656, the brightness pattern is obtained by a detector in a prescribed resolution, and the discrimination between the authentic securities certificate and a reproduction is performed on the basis of the brightness pattern thus obtained.

However, in order to irradiate the substrate surface and the printing surface with light beams for obtaining the brightness pattern contained in the transmitted light beam or the reflected light beam on the surface, it is necessary for a printing pattern providing a key to the detection to be present. To be more specific, if the reading line of the brightness pattern deviates even slightly, the read brightness pattern is rendered quite different from the brightness pattern contained in the transmitted light beam or the reflected light beam.

Also, in another conventional discriminating apparatus as disclosed in Japanese Patent Disclosure No. 2003-323656 referred to above, it is necessary to suppress the fluttering or wrinkling of the printed matter to a level lower than the depth of the focal point at which sufficient resolution can be obtained in the portion where a printing pattern providing a key to the detection is present. It follows that high accuracy is required in the transfer device of the discriminating apparatus, so as to make it difficult to discriminate the printed matter at high speed. This difficulty does not provide a critical defect in the discriminating apparatus mounted to an apparatus not requiring the processing at high speed such as an ATM because the serviceability ratio of the discriminating apparatus section is low, though the processing rate of, for example, the ATM is lowered. However, it is difficult to use such a discriminating apparatus in a machine required to handle a large amount of printed matter for performing the discrimination between the original and a reproduction.

It should also be noted in conjunction with the conventional discriminating apparatus that, if fluttering or wrinkling is generated in the printed matter in a magnitude larger than the depth of the focal point, the erroneous discrimination is increased.

BRIEF SUMMARY OF THE INVENTION

An object of the present invention is to provide a discriminating apparatus that permits discrimination between the original and a reproduction of printed matter at high speed and also permits suppressing the possibility of erroneous discrimination.

According to a first aspect of the present invention, there is provided an apparatus for discriminating a printed matter having a surface area, comprising:

a transfer device configured to transfer the printed matter;

a light source configured to project a light beam to the surface area to scan the surface area with the light beam, the surface area corresponding to one of a substrate region of an original and a printed region similar the substrate region;

a detector configured to detect the intensity of the light beam reflected from the surface area to generate an output signal including the output component reflected from one of the substrate region and the similar region; and a discriminating unit configured to discriminate whether the printed matter is the original or not based on the amplitude of the output component.

Further, according to a second aspect of the present invention, there is provided an apparatus for discriminating a printed matter having a surface area, comprising:

a light source configured to project a light beam to a surface area of a printed matter, the surface area corresponding to one of a substrate region of an original and a printed region similar to the substrate region;

a detector configured to detect an intensity of the light beam reflected from the surface area to generate an output signal;

a moving mechanism configured to relatively move the detector and the printed matter to scan the surface area with the detector; and a discriminating unit configured to discriminate whether the printed matter is the original or not based on the amplitude of the output signal component.

BRIEF DESCRIPTION OF THE SEVERAL VIEWS OF THE DRAWING

FIGS. 7A and 7B are a table and a graph, respectively, wherein FIG. 7B is a graph showing the output levels of the photodetector relative to the scanning distance, which were experimentally obtained by the discriminating apparatus shown in FIG. 1, and FIG. 7A is a table showing the measured data;

DETAILED DESCRIPTION OF THE INVENTION

A discriminating apparatus according to an embodiment of the present invention will now be described with reference to the accompanying drawings.

First Embodiment

Figure 1:
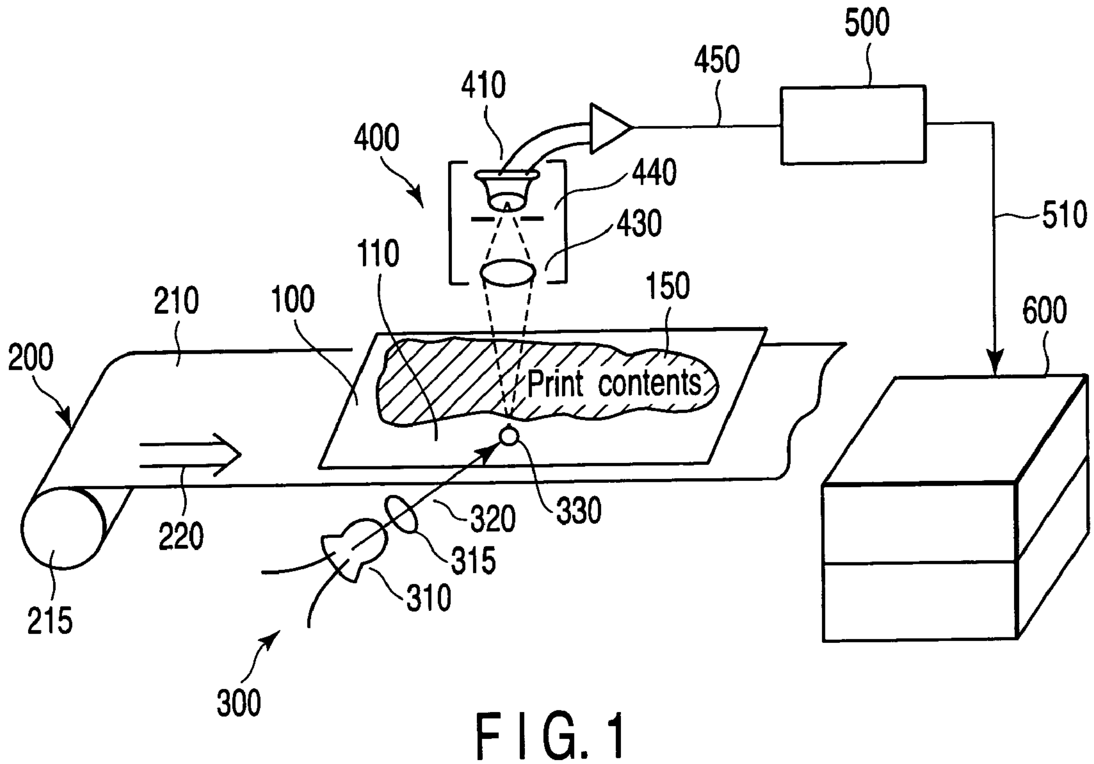
FIG. 1 is a block diagram schematically showing the construction of the discriminating apparatus according to a first embodiment of the present invention.

FIG. 1 is a block diagram schematically showing the construction of a discriminating apparatus according to a first embodiment of the present invention.

The discriminating apparatus shown in FIG. 1 comprises a transfer device 200 for transferring printed matter 100, a lamp unit 300 for illuminating the printed matter 100, a photodetector 400 for detecting the light beam reflected from the printed matter 100, and a discriminating unit 500 for performing the discrimination as to whether the printed matter is the original or a reproduction in accordance with the detection signal generated from the photodetector 400. It is also possible for the discriminating apparatus to include, if necessary, a selecting device 600 for selecting the printed matter 100 transferred by the transfer device 200 in accordance with the discrimination signal generated from the discriminating unit 500.

The transfer device 200 includes a transfer belt 210 and a driving means 215. The driving means 215 is mounted in a rotatable manner such that the driving means 215 can be rotated by a power source such as a motor. The transfer belt 210 is mounted to the driving means 215 in a manner to surround the driving means 215 like a crawler. The transfer belt 210 is designed to transfer the printed matter 100, i.e. the workpiece, in a transfer direction 220.

The printed matter 100 represents printed matter that impairs the social function if reproduced, e.g., securities certificate such as a paper currency, a stock certificate, or a merchandise bond. Unlike ordinary printed matter, the printed matter 100 is obtained by printing the print contents 150 on a substrate 110 of a specified color, e.g., a pale reddish purple substrate 110. The print contents 150 are printed by a specified printing method, e.g., by employing a relief press. Further, the substrate 110 is formed of a sheet having a sufficient mechanical strength, e.g., a relatively thick paper sheet or a polyvinyl chloride sheet.

The lamp unit 300 includes a light source 310 and a lens 315. The light source 310 is mounted for projecting a light beam 320 onto the printed matter 100 transferred by the transfer device 200. It is necessary to set appropriately the angle between the surface of the printed matter 100 and the light beam 320. To be more specific, in order to maintain high reflectance and to avoid the interference between the light beam 320 and the photodetector 400, it is desirable for the angle between the surface of the printed matter 100 and the light beam 320 to be set at 45±10°.

It is desirable for the light beam 320 emitted from the light source 310 to be green. To be more specific, it is desirable for the light beam 320 noted above to have a wavelength of 520 to 535 nm. It is particularly desirable for the light source 310 to be formed of a light emitting linear diode (LED) or a laser diode because the amount of the light beam having an undesired extra wavelength, which is contained in the light beam emitted from these diodes, is very small, and the power consumption of these diodes is small. The lens 315 is mounted for converging the light beam emitted from the light source 310 onto a predetermined illuminating region 330.

Figure 2:
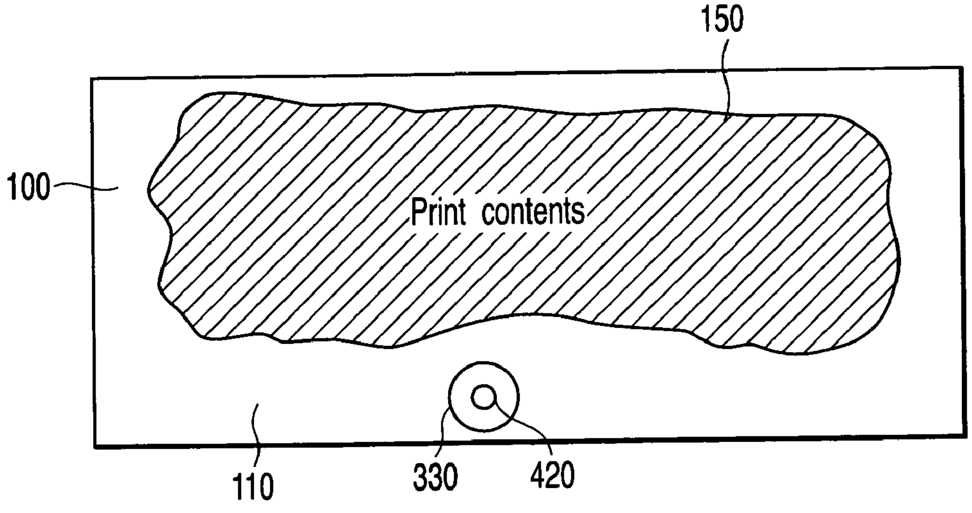
FIG. 2 schematically shows in a magnified fashion the printed matter that is subjected to the discrimination by the discriminating apparatus shown in FIG. 1.

FIG. 2 shows the printed matter 100 under the state of being irradiated with the light beam emitted from the light source 310. The illuminating region 330 on the substrate 110 of the printed matter 100 is irradiated with the light beam emitted from the light source 310 and converged by the lens 315. Among the light beam irradiating the illuminating region 330, the light beam reflected from within a spot 420 is detected by the photodetector 400. In order to permit the photodetector 400 to detect the reflected portion of the light beam emitted from the light source 310 in spite of the fluttering or wrinkling of the printed matter 100, it is desirable for the illuminating region 330 to have an appropriate area, i.e., a diameter of about 1.0±0.2 mm.

The photodetector 400 includes a sensor 410, a lens 430, and a pin hole 440. The photodetector 400 is mounted for measuring the intensity of the reflected portion of the light beam 320 emitted from the light source 310 for irradiating the printed matter 100. The photodetector 400 is mounted at a position at which the reflected portion of the light beam 320 emitted from the light source 310 for irradiating the printed matter 100 is incident on the photodetector 400. The reflected light beam incident on the photodetector 400 is converged by the lens 430 and, then, is incident on a light beam receiving section 415 (see FIG. 3) of the sensor 410. Further, the sensor 410 serves to convert the intensity of the light beam incident on the light beam receiving section 415 into an electric signal (output signal).

Figure 3:
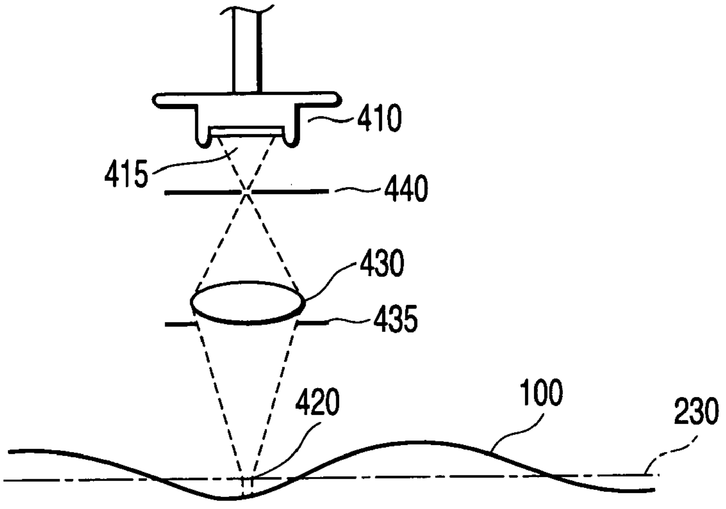
FIG. 3 schematically shows in a magnified fashion the optical system included in the discriminating apparatus shown in FIG. 1.

The pin hole 440 is formed between the lens 430 and the sensor 410. As shown in FIG. 3, a spot 420 and the pin hole 440 collectively form a conjugate (image forming) relations with respect to the lens 430. To be more specific, a lens system including the lens 430 is constructed to permit the image-formed pin hole and the light source to have conjugate relations. The light beam passing through the pin hole 440 is incident on the light beam receiving section 415. Also, a diaphragm 435 is arranged to be positioned between the lens 430 and the printed matter 100. It is possible to control the amount of the reflected light incident on the light beam receiving section 415 by controlling the open area of the diaphragm 435.

The lens 430 will now be described in detail. It is desirable for the numeral aperture NA of the lens 430 to be about 0.03. Also, the lens 430 has a diffraction limit performance such that the aberration of the lens 430 is sufficiently small, compared with the wavelength of the light beam, and the resolution of the discriminating apparatus is determined only by the wavelength of the light beam and the numerical aperture of the lens 430.

Figures 4A, 4B:
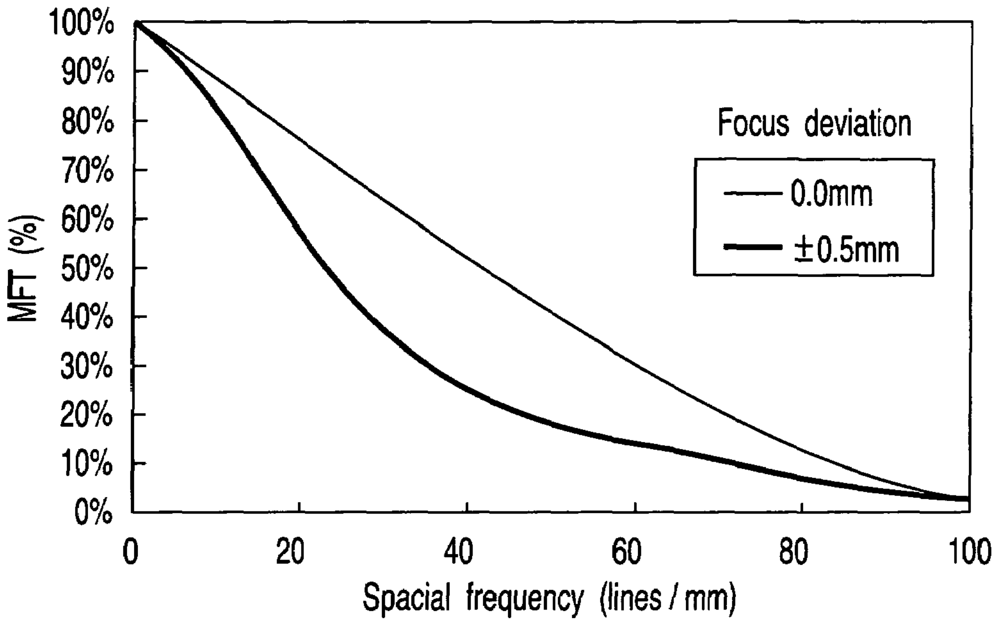
FIGS. 4A and 4B are a graph and a table, respectively, showing the MTF characteristics curve in the stigmatic lens having an NA value of 0.03 and the MTF characteristics data.

FIG. 4A is a graph showing the MTF characteristics, covering the case of using astigmatic lens having a numerical aperture NA of 0.03. In the graph of FIG. 4A, MTF (contrast repeatability) is plotted on the ordinate, and the spatial frequency (lines/mm) is plotted on the abscissa. In the case of an ideal lens having a circular opening (stigmatic lens), the number of resolutions is MTF 9%. Also, in the case of a practical lens in which aberration remains unremoved to some extent, the number of resolutions is MTF 10 to 20%, as described in "Construction and Application of Optical System" compiled by Compiling Dept. of Optronics Inc. and published by Optronics Inc. It follows that, if a stigmatic lens having a numerical aperture (NA) of 0.03 is used in the case where it is possible for ±0.5 mm of deviation in the focal point to take place, the spatial frequency is 74 lines/mm and it is necessary for the spot 420 to have a diameter of at least 6.75 μm.

Incidentally, where the resolution of a reproduction of the printed matter 100 is coarser than 8 lines/mm, it can be visually confirmed easily by the naked eye whether the printed matter 100 is the original or a reproduction. It follows that it is unnecessary for the diameter of the spot 420 to be larger than 125 μm.

The relationship among the transfer device 200, the lamp unit 300, and the photodetector 400 will now be described. As described previously, the transfer device 200 is arranged to transfer the printed matter 100 in the transfer direction 220. The transfer direction 220 is set to permit the lamp unit 300 to illuminate the surface (non-print section) of the substrate 110 of the printed matter 100 and to permit the photodetector 400 to scan the light beam reflected from the surface of the substrate 110. The transfer direction 220 is also set to permit the print contents 150 of the printed matter 100 to be substantially in parallel to the printed surface (print surface).

Incidentally, the expression "substantially parallel" noted above implies that, when the photodetector 400 scans the light beam reflected from the surface of the substrate 110, the print contents 150 is parallel to the printed surface to some extent such that at least a part of the printed matter 100 is movable within the depth of the focal point, i.e., movable within a range of ±0.5 mm in this embodiment. It should be noted that, within a range of ±0.5 mm of the depth of the focal point, it is possible to secure a sufficient resolution even in the event of occurrence of the maximum deviation of the focal point of ±0.5 mm.

The discriminating unit 500 is connected to the photodetector 400 via the output signal transmitting path 450. It is possible for the discriminating unit 500 to be formed of an information processing apparatus such as a microcomputer or a sequencer comprising, for example, an arithmetic device or a memory means. The intensity of the light beam converted into an electric signal by the photodetector 400 is sampled (detected) by the discriminating unit 500 at a predetermined pitch. For example, where the transfer device 200 is set to transfer the printed matter 100 at a transfer rate of 1 m/sec, the sampling is performed at a pitch of 100,000 times (10 μm)/sec. Where the sampling pitch is set at 10 μm/sec, the capacity of the sampling data sampled by the discriminating unit 500 is about 100 kB/sec. Even in view of the process capacity of the microcomputer or the sequencer available nowadays, the data rate noted above sufficiently permits the discriminating unit 500 to perform its discriminating operation.

The discriminating unit 500 performs its discriminating function as to whether the printed matter 100 is the original or a reproduction based on the data on the intensity of the light beam sampled by the discriminating unit 500. The result of the discriminating operation performed by the discriminating unit 500 is generated to the outside via the output path 510 of the result of the discrimination.

The selecting device 600 is connected to the output path 510 of the result of the discrimination. The selecting device 600 many be arranged as desired or may be omitted. For example, it is possible for the selecting device housed in an ATM or an automatic vending machine to be omitted. Also, it is desirable for the selecting device 600 to be mounted in the case where the discriminating apparatus is used in, for example, a bank as a currency discriminating apparatus.

Based on the result of the discrimination, which is generated through the output path 510 of the result of discrimination, the selecting device 600 classifies the printed matter 100 into originals and reproductions and discharges separately originals and the reproductions thus classified. Where the printed matter 100 has been found to be originals, the selecting device 600 discharges originals thus found to the ordinary discharge port of the discriminating apparatus. On the other hand, where the printed matter 100 has been found to be a reproduction, the selecting device 600 discharges the reproduction to the discharge port of the discriminating apparatus, which is arranged exclusively for the reproduction. In this case, it is possible to display the number of discharged originals and the number of discharged reproductions on a display screen by using a counter (not shown).

The discriminating operation using the discriminating apparatus according to the embodiment of the present invention will now be described in detail. In the first step, differences between the original and a reproduction of the printed matter 100 will now be described.

Figure 5:
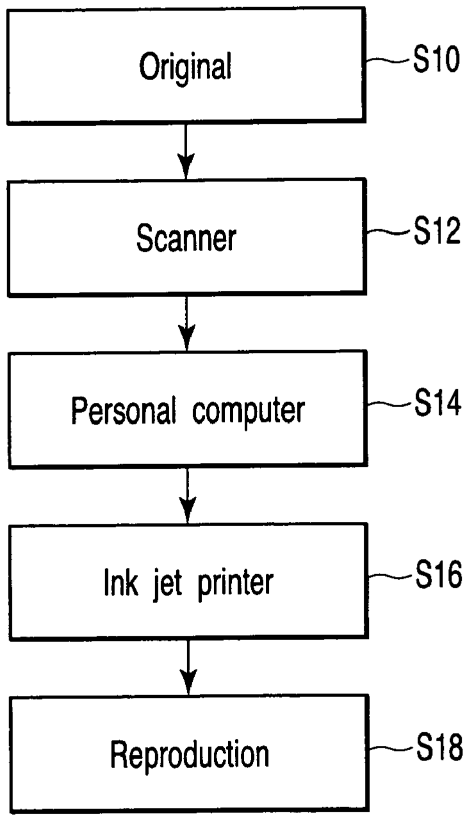
FIG. 5 is a flow chart exemplifying the process of obtaining a reproduction of printed matter 100, which is to be subjected to the discrimination by the discriminating apparatus shown in FIG. 1, from the original.

In the case of preparing a reproduction, the original is prepared first in general (step S10 shown in FIG. 5). In the original of the printed matter 100, the print contents 150 is printed by a relief-printing on, for example, a pale reddish purple substrate 110. On the other hand, in the preparation of a reproduction, the original of the printed matter 100 forming a sample is once converted into electronic data by using an imaging device such as a color scanner, as shown in FIG. 5

(step S12). Then, noise is removed from the electronic data thus converted by using an information processing device such as a CPU, which is mounted in a personal computer or a copying machine. Also, the data is processed so as to correct the color (step S14). Further, the processed electronic data is printed on a paper sheet used for manufacturing a reproduction by using a printer such as an ink jet printer or a laser printer (step S16). As a result, manufactured is a reproduction having a pattern and characters equal to those of the original printed thereon (step S18).

Figure 6A:
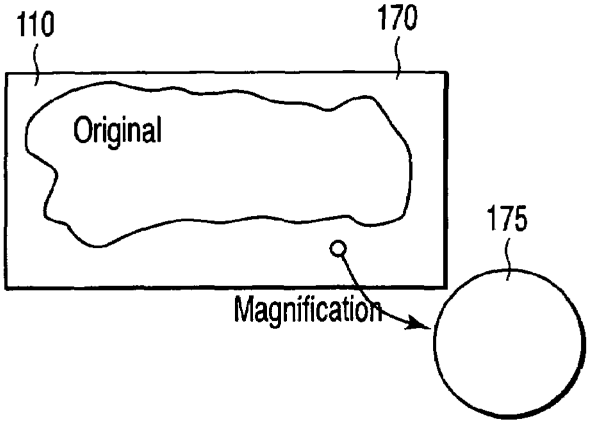
FIGS. 6A and 6B are plan views schematically showing the images obtained from a reproduction and from the original of printed matter 100 that is to be subjected to the discrimination by the discriminating apparatus shown in FIG. 1, the obtained images differing from each other.
Figure 6B:
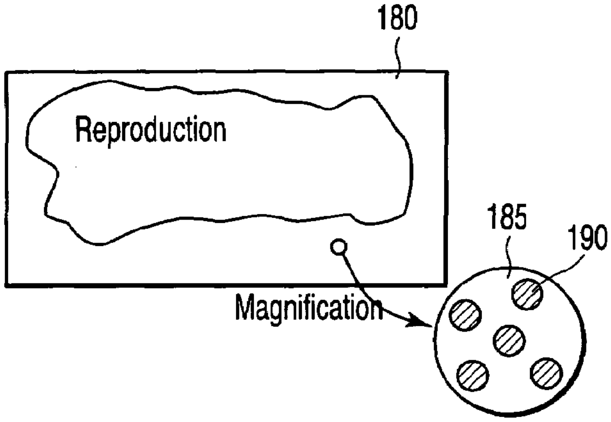

FIGS. 6A and 6B schematically show, respectively, the original 170 of the printed matter 100 prepared in advance and a reproduction 180 of the printed matter 100 manufactured by the process described above. As shown in FIG. 6A, the substrate 110, if observed in a magnified fashion, of the original 170 is formed of a plain foundation 175. On the other hand, if that portion of the reproduction 180 which corresponds to the substrate 110 of the original 170 is observed in a magnified fashion, it is seen that dots 190 of a reddish purple ink (M for CYMK) are printed on a white paper sheet 185 at an interval conforming with the brightness of the pale reddish purple substrate, as apparent from FIG. 6B.

The difference noted above between the reproduction 180 and the original 170 is brought about because the printer is designed on the basis that the printing is performed by using a paper sheet having a high degree of whiteness in order to increase the color reproducibility of the printer. It follows that if it is intended to reproduce the original 170 having a pale reddish purple color tint, the dots 190 as shown in FIG. 6B are also printed in that region of the original which corresponds to the substrate 110.

Also, where the dots 190 are not printed, the original 170 and the reproduction 180 differ from each other in the color of that portion of the original 170 which corresponds to the substrate 110, with the result that the discrimination between the original 170 and the reproduction 180 can be performed easily even with the naked eye. It should also be noted that, where the reproduction 180 is printed by using a pale reddish purple substrate 110 as in the printing of the original, the original 170 and the reproduction 180 differ from each other in the color of the print contents 150 so as to make it possible to discriminate easily between the original 170 and the reproduction 180 even with the naked eye.

Further, the ink particles used in a printer available nowadays are about 2 pL in the case of, for example, the ink jet printer, and the dots 190 printed on the substrate 110 have a diameter of about 16 μm. It follows that it is possible to perform the discrimination as to whether the printed matter 100 is the original or a reproduction by allowing the photodetector 400 to detect the dot 190 in the form of the intensity of the light beam and to convert the presence or absence of the dot 190 into the amplitude of the electric signal and by allowing the discriminating unit 500 to compare the amplitude of the electric signal with the amplitude of the light beam that is to be sampled in the original 170.

The comparison in the amplitude of the electric signal, which is performed by the discriminating unit 500, will now be described. Specifically, the discriminating unit 500 obtains the value forming a comparable index from the amplitude of the electric signal in a position corresponding to the substrate surface 110 of the original 170. The index value noted above is obtained from among the data on the intensities of the sampled light beams. Then, the index is compared with a prescribed threshold value so as to determine whether or not the printed matter 100 is the original or a reproduction. For obtaining the threshold value, the data on the intensity of the light beam is obtained from a plurality of originals, and the threshold value is determined on the basis of the data thus obtained in view of the margin.

The index is provided by, for example, the difference between the maximum value and the minimum value obtained from the data on the intensities of the sampled light beams, the contrast value, the arithmetic average roughness, the maximum height, the 10 points average roughness or the square average roughness, or a combination of a plurality of these indexes. In this embodiment, the contrast value is taken up as an example. It should be noted that the arithmetic average roughness, the maximum height, the 10 points average roughness or the square average roughness are described in detail in JIS B 0601 and, thus, description thereof is omitted herein.

The contrast value is the value obtained by formula (1) given below:

$$(Amax-Amin)/(Amax+Amin) \quad (1)$$

where Amax denotes the maximum value of the intensity of the sampled light beam, and Amin denotes the minimum value of the intensity of the sampled light beam.

It is necessary to suppress the influences given by fluttering and wrinkling of the printed matter 100 to the data on the intensity of the light beam as much as possible. Such being the situation, in sampling the data on the intensities of the light beams, the discriminating unit 500 selects a part of the data on the intensities of the light beams sampled at the portion where the printed matter 100 has been moved within a range of the focal point depth ±0.5 mm. For example, where the printed matter 100 was moved by 12 cm so as to bring about the fluttering of 2 mm as a whole and there was a deviation within a range of ±0.5 mm in the movement of the printed matter 100 by 3 cm after the movement by 12 cm, optional consecutive data, e.g., 7 data, are selected from the data on the intensities of the sampled light beams when the printed matter 100 was moved by 3 cm. Then, the contrast value is obtained from the selected optional data by using formula (1) given above.

Figures 7A, 7B:
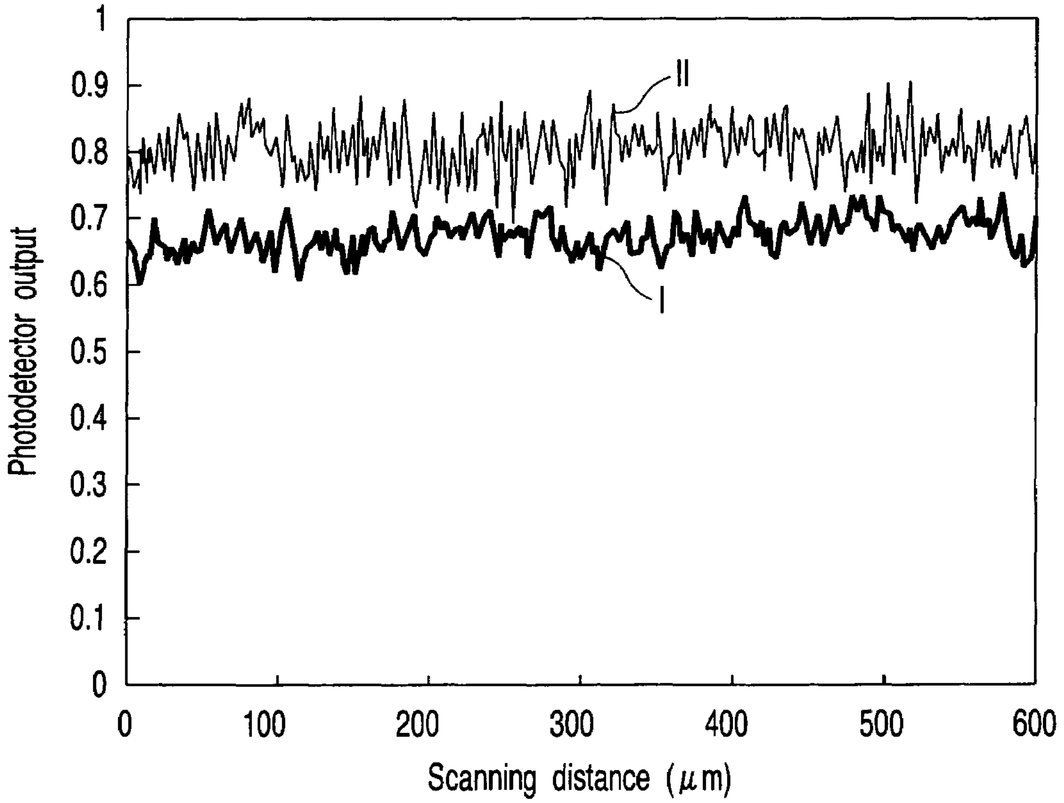

FIGS. 7A and 7B are a table and a graph, respectively, showing the experimental data, covering the case where the original and a reproduction of the printed matter are irradiated with the light beam emitted from the lamp unit 300 included in the discriminating apparatus shown in FIG. 1, followed by converting the intensities of the reflected light beams into electric signals by the photodetector 400 and subsequently sampling the electric signals thus obtained in the discriminating unit 500. In the graph of FIG. 7B, the output signal generated from the photodetector 410 and sampled by the discriminating unit 500 is plotted on the ordinate, and the distance moved by the printed matter 100 during the sampling operation, i.e., the scanning distance required for the photodetector 400 to scan the light beam reflected from the surface of the substrate 110, is plotted on the abscissa. Also, in FIG. 7B, graph I denotes the detected signals of the light beams reflected from the printed matter constituting the original, and graph II denotes the detected signals of the light beams reflected from the printed matter forming a reproduction. The contrast values obtained from the experimental data are given in the table of FIG. 7A. As apparent from the table, the contrast value for the reproduction is about 10 times as large as that for the original. Such being the situation, it is considered reasonable to judge that the contrast value larger than 0.1 denotes a reproduction and that the contrast value not larger than 0.1 denotes the original.

Figure 8:
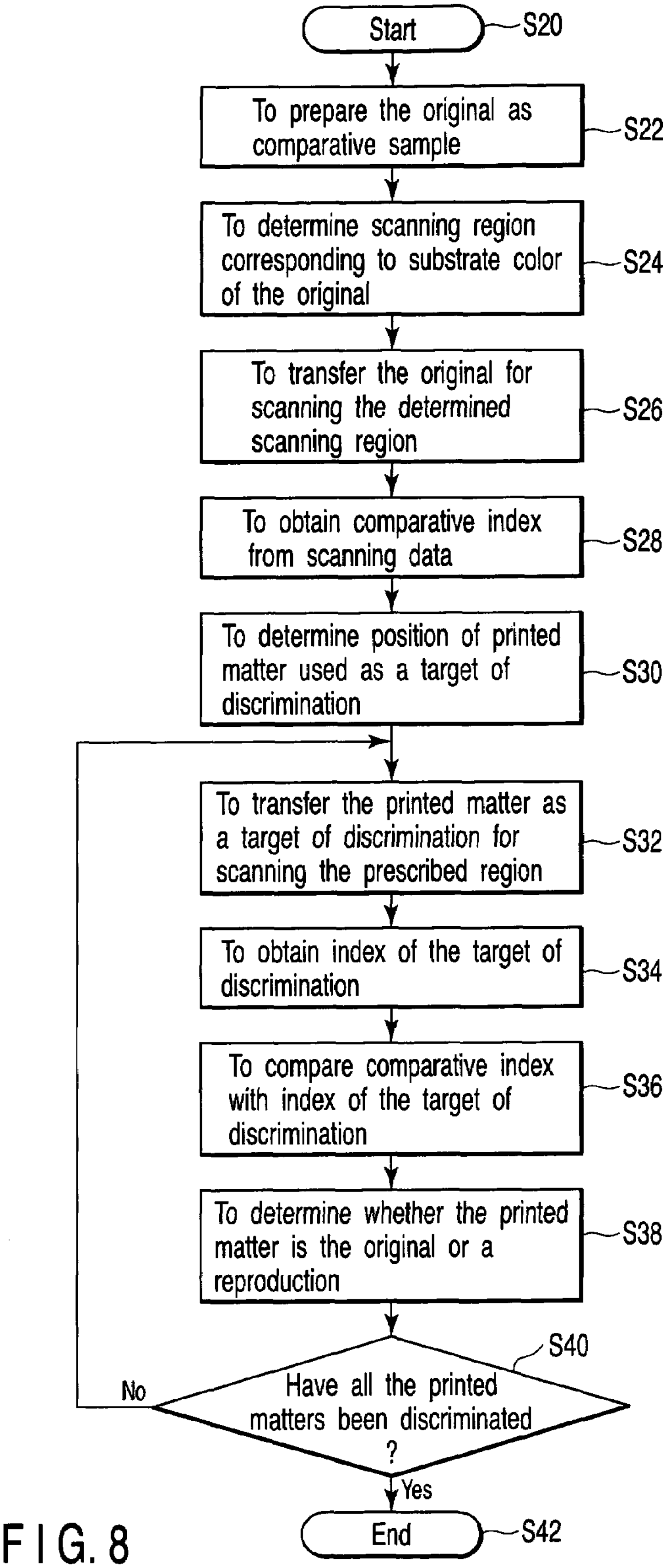
FIG. 8 is a flow chart showing the process of discriminating the printed matter by the discriminating apparatus shown in FIG. 1.

As apparent from the description given above, in the discrimination of the printed matter utilizing the discriminating apparatus shown in FIG. 1, the discrimination as to whether the printed matter is the original or a reproduction is performed in accordance with the procedure shown in FIG. 8.

In starting the discriminating operation in step S20 shown in FIG. 8, prepared is printed matter corresponding to the original as a comparative sample as shown in step S22. Then, the region in which appears the substrate color alone of the prepared original is determined as the scanning region as shown in step S24. For example, if there is a non-printed region in the edge of the original printed matter, the non-printed region is selected as a region that is to be scanned. The original printed matter is arranged on the transfer belt of the discriminating apparatus shown in FIG. 1 so as to be positioned such that a prescribed region of the original printed matter is scanned by the light beam. Then, the discriminating apparatus shown in FIG. 1 is operated so as to permit the prescribed region of the original printed matter to be scanned by the light beam as shown in step S26. The light beam reflected from the printed matter is detected by the photodetector 400 so as to obtain the data as shown in graph I of FIG. 6B. A comparative index is prepared from the data thus obtained as shown in step S28. As described previously, the index includes the contrast value, the arithmetic average roughness, the maximum height, the 10 points average roughness, or the square average roughness or an index is prepared by combining a plurality of these indexes and is stored in a memory.

In the next step, prepared is printed matter that is to be discriminated. As shown in step S30, the printed matter to be discriminated is arranged on the transfer belt 210 of the discriminating apparatus so as to be positioned such that the printed matter to be discriminated is scanned by the light beam as in the original printed matter. Then, as shown in step S32, the printed matter to be discriminated is transferred by the transfer belt so as to be scanned by the light beam, and the reflected light beam is detected by the photodetector 400. It follows that the data denoted by graph I or graph II in FIG. 7B are generated from the photodetector 400. The detected data is processed as shown in step S34 so as to obtain an index similar to that of the original printed matter. The index to be discriminated is compared with the comparative index of the original printed matter as shown in step S36 so as to determine whether or not the printed matter to be discriminated is the original or a reproduction, as shown in step S38. Then, it is confirmed whether or not all the printed matters to be discriminated have been discriminated as shown in step S40. If there is printed matter that has not been discriminated, the operation is brought back to step S32. On the other hand, if it has been confirmed in step S40 that the discrimination of all the printed matters has been completed, the discriminating operation is finished as shown in step S42.

As described above, the discriminating apparatus of the present invention makes it possible to perform discrimination at a high speed as to whether the printed matter 100 is the original or a reproduction. Since the printed matter need not be positioned accurately, the discrimination can be performed at a high speed in the present invention. To be more specific, it is unnecessary in the present invention to perform the positioning to irradiate the aimed printing pattern with the light beam for obtaining the brightness of the amplitude conforming with the printing pattern printed in advance on the printed matter 100, and it suffices for the region corresponding to the substrate color of the original to be scanned. Such being the situation, a high speed processing can be achieved in the present invention. In general, the blank portion having a large area of the printed matter 100, i.e., the surface of the substrate 110, is irradiated with the light beam in the present invention so as to make it unnecessary to perform the positioning at a high accuracy. A blank portion having a width of about 5 mm is formed on the general printed matter 100 such as paper currency. It follows that the allowable error in the positioning of the printed matter 100 is about ±2 mm and, thus, an accurate discrimination can be performed by performing the positioning in a simple and easy method.

It should also be noted that, when discrimination is performed as to whether the printed matter is the original or a reproduction, the possibility of the erroneous discrimination is very low. Where the substrate surface and the printing surface are irradiated with the light beam for obtaining a brightness pattern conforming with the printing pattern, it is possible for an erroneous discrimination to be made if fluttering or wrinkling greater than the focal point depth of the photodetector 400 is included in the aimed printing pattern portion. However, the discriminating apparatus according to the embodiment of the present invention selects the data on the intensity of the light beam in the portion where the fluttering or wrinkling is included within the range of the focal point depth of the photodetector 400. It follows that the possibility of erroneous discrimination is very low in the discriminating apparatus according to the embodiment of the present invention.

Incidentally, it is possible for the discriminating apparatus according to the embodiment of the present invention to comprise further a color sensor. If a color sensor is further included in the discriminating apparatus, it is possible to detect the color of the printed matter 100, i.e., the color of the substrate 100 or the print contents 150, so as to perform the discrimination as to whether the printed matter is the original or a reproduction by further using the detected color data.

Second Embodiment

A discriminating apparatus according to a second embodiment of the present invention will now be described with reference to FIGS. 9 to 12. In the following description, the same reference numerals are used to denote the portions equivalent to those in the first embodiment of the present invention described previously in conjunction with FIGS. 1 to 8 to avoid overlapping description.

Figure 9:
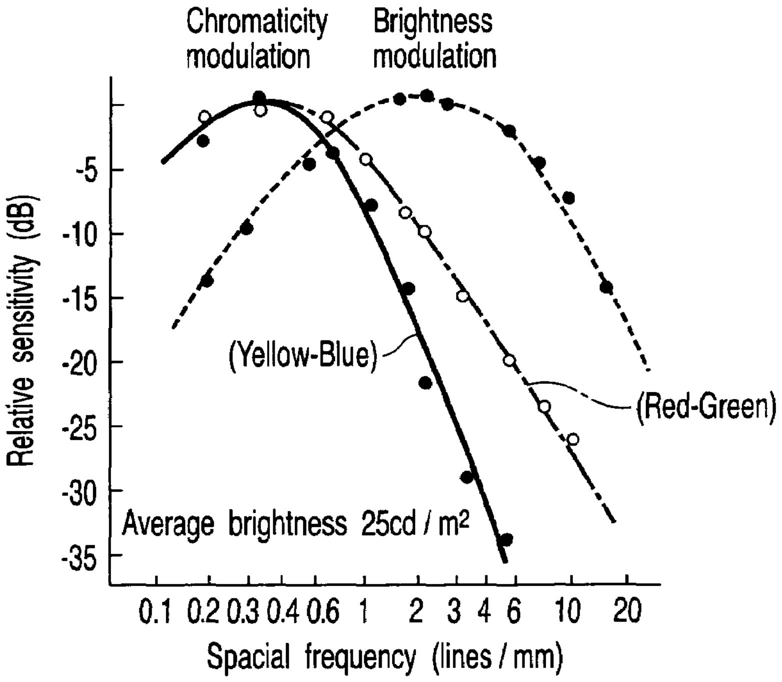
FIG. 9 is a graph showing the sensitivity relative to the spatial frequency in the color of the human eye.
Figure 10A:
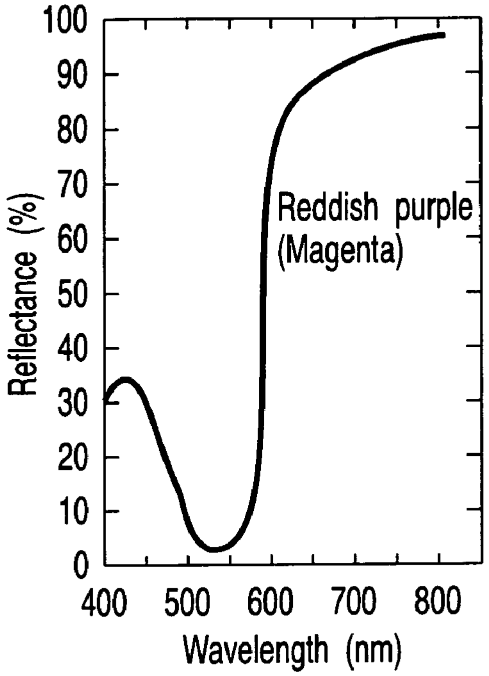
FIGS. 10A, 10B and 10C are graph each showing the relationship between the reflectance and the wavelength of the light beam irradiating the inks of the general reddish purple, bluish green and yellow colors.
Figure 10B:
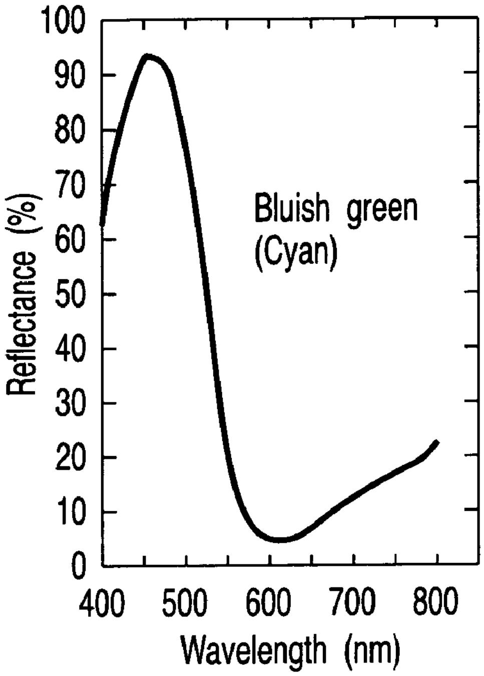
Figure 10C:
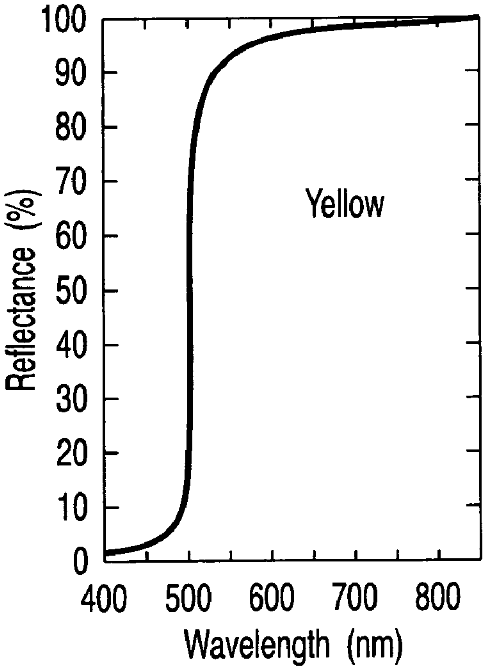

FIG. 9 is a graph showing the sensitivity relative to the color of the human eye. In the graph of FIG. 9, the relative sensitivity (dB) of the human eye is plotted on the ordinate, and the spatial frequency (lines/mm) is plotted on the abscissa. Also, FIGS. 10A, 10B and 10C are graphs each showing the relationship between the wavelength and the reflectance of the irradiating light beam in respect of the inks of the general colors of reddish purple (magenta), bluish green (cyan), and yellow, respectively. In each of these graphs, the reflectance (%) is plotted on the ordinate, and the wavelength (nm) is plotted on the abscissa.

The printed matter 100 is obtained by printing the print contents 150 on a pale yellow substrate 110. The light beam 320 emitted from the light source 310 is colored blue. To be more specific, the wavelength of the light beam 320 noted above falls within a range of 400 to 500 nm. It is possible to use a blue LED or a blue laser diode as the light source 310. The discriminating apparatus according to the second embodiment of the present invention will now be described in detail.

As shown in FIG. 9, the yellow pattern cannot be recognized by the human eye even if the density of the pattern is low, i.e., one tenth times as high as that of the black pattern and one third times as high as that of the reddish purple pattern. It follows that two kinds of yellow ink differing from each other in brightness is unlikely to be used as an ink in the ordinary printer, though it is possible to use in the ordinary printer two kinds of reddish purple and bluish green inks differing from each other in concentration. Such being the situation, a thick yellow ink alone is used in the printer by utilizing the low resolution of the human eye relative to the yellow color, and a pale yellow is represented by performing printing under the state that the interval between the thick yellow dots is increased.

Also, as shown in FIGS. 10A, 10B and 10C, the reflectance is very low in the case where a yellow ink is irradiated with a blue light beam having a wavelength not longer than 500 nm. On the other hand, the reflectance is very high when the yellow ink is irradiated with a light beam having a wavelength not shorter than 500 nm. In other words, in the case of the irradiation with a light beam having a wavelength not longer than 500 nm, the reflectance on the substrate surface is left unchanged, though the reflectance is very low in the portion printed with thick yellow dots. Incidentally, where a yellow ink is irradiated with a light beam having a wavelength shorter than 400 nm, it is possible for the reflectance to differ depending on the kind of the ink because the light beam of the wavelength noted above cannot be recognized by the human eye. Under the circumstances, the resolution of the yellow color performed by the photodetector 400 is improved if the wavelength of the light beam emitted from the light source 310 falls within a range of 400 to 500 nm.

The discriminating apparatus according to the second embodiment of the present invention described above makes it possible to perform the discrimination as to whether the printed matter 100 is the original or a reproduction at a high speed like the discriminating apparatus according to the first embodiment of the present invention described previously. Also, in performing the discrimination as to whether or not the printed matter is the original or a reproduction, the possibility of erroneous discrimination is very low.

Further, since the resolution of the yellow color performed by the photodetector 400 is improved, compared with the discriminating apparatus according to the first embodiment of the present invention, the possibility of an erroneous discrimination can be further lowered. It should also be noted that, since a pale yellow is achieved in the printed matter obtained by the printing with a printer by performing the printing under the state that the distance between the adjacent thick yellow dots is increased, the photodetector 400 exhibits sufficient allowance in the resolution of the yellow color so as to further lower the possibility of the erroneous discrimination.

Figure 11A:
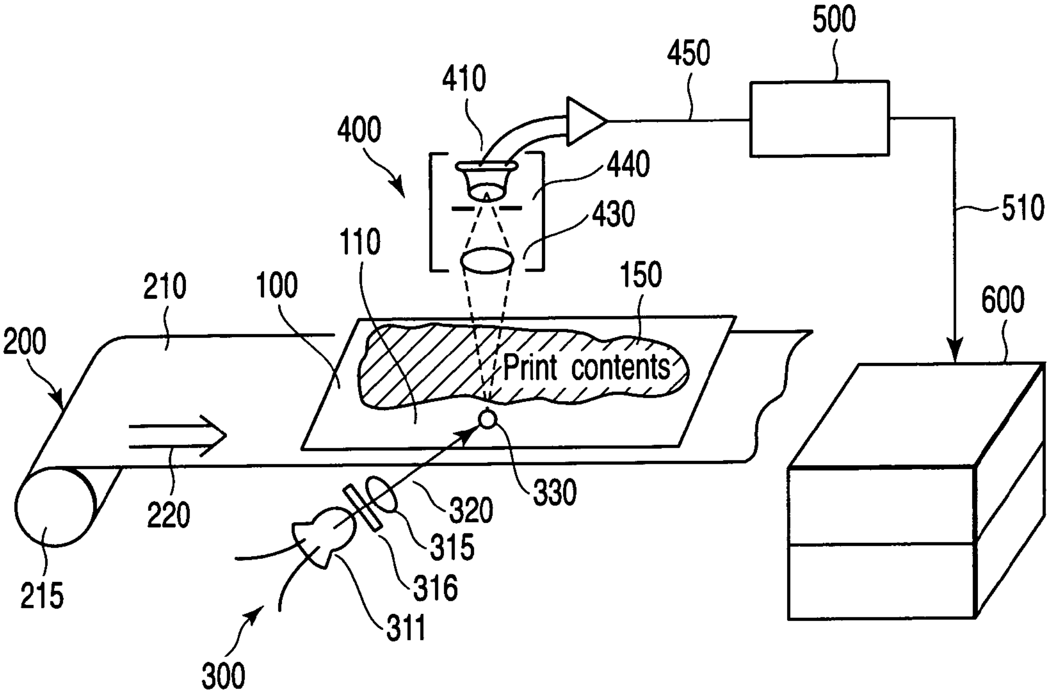
FIGS. 11A and 11B are block diagrams schematically showing the construction of a discriminating apparatus according to a modification of the first embodiment of the present invention.
Figure 11B:
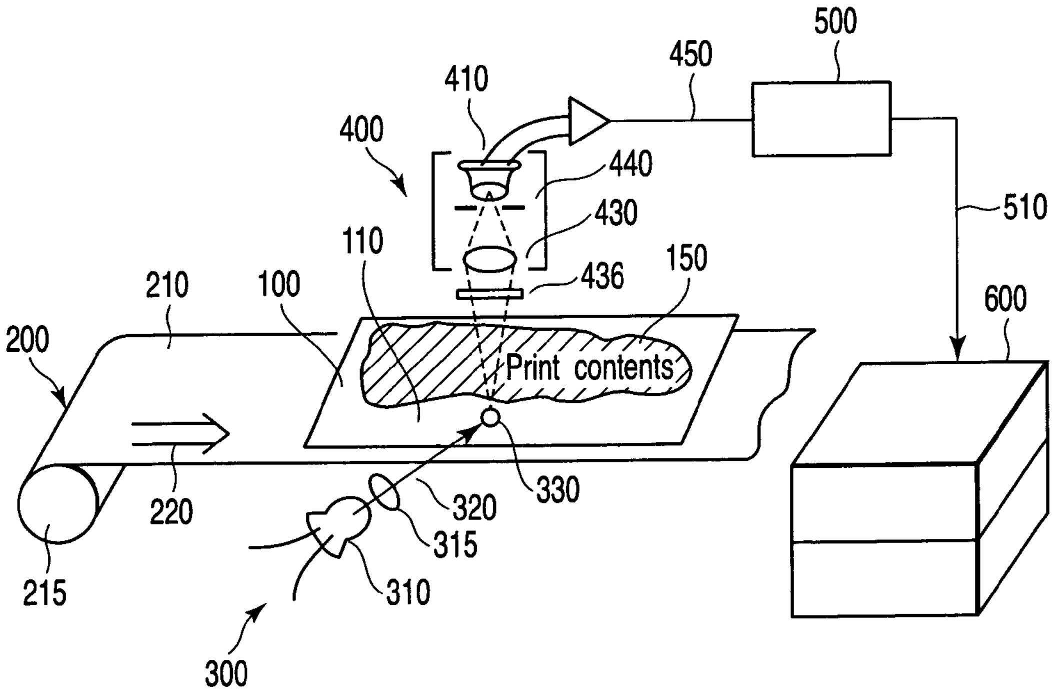

Incidentally, in the embodiment described above, the light source 310 is formed of a green LED, a blue LED, a green laser diode or a blue laser diode. However, it is also possible to use as the light source 310 a lamp unit 311 for emitting a white light beam such as a halogen lamp unit in combination with an optical filter 316 capable of selectively transmitting the green light beam alone having a wavelength of 520 to 535 nm or the blue light beam alone having a wavelength of 400 to 500 nm, which are included in the white light beam emitted from the halogen lamp unit, as shown in FIG. 11A.

Also, it is possible to use in place of the optical filter 316 a lamp unit light source 310 emitting a white light beam 320 and an optical filter 436 that is arranged between the printed matter 100 and the sensor 410 and permits selectively transmitting a green light beam alone having a wavelength of 520 nm to 535 nm or a blue light beam alone having a wavelength of 400 nm to 500 nm, which is included in the white light beam emitted from the lamp unit light source 310.

Also, it is possible for the discriminating apparatus according to the second embodiment of the present invention to include further a color sensor like the discriminating apparatus according to the first embodiment of the present invention. It is also possible to combine a known discriminating method with the discriminating apparatus according to the second embodiment of the present invention.

Figure 12:
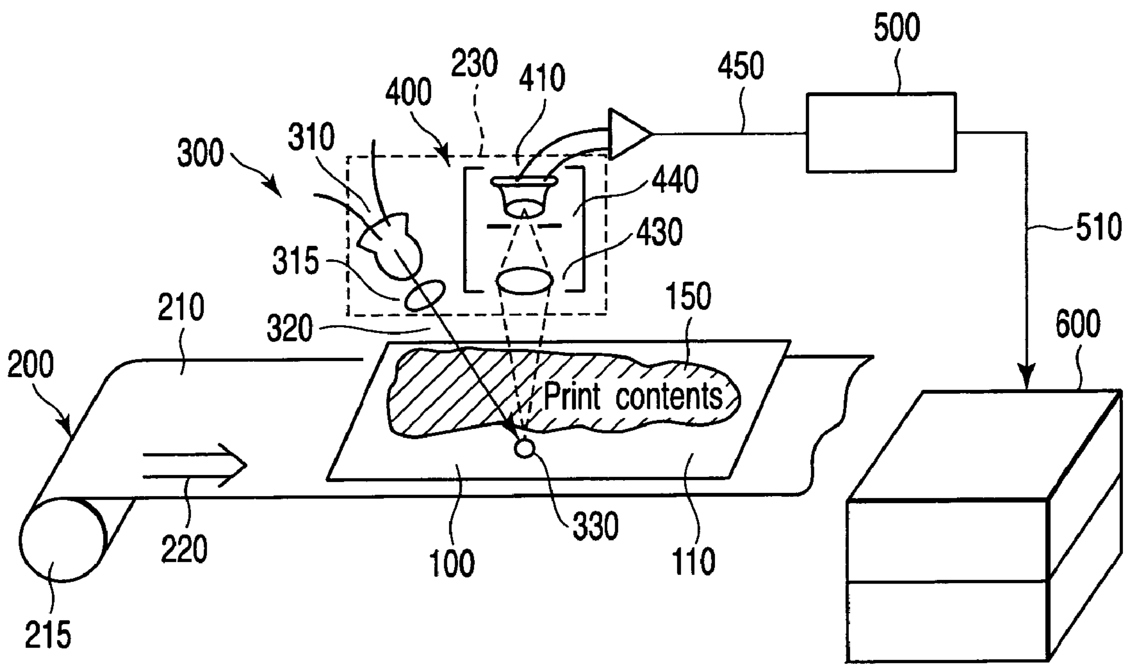
FIG. 12 is a block diagram schematically showing the construction of a discriminating apparatus according to another modification of the first embodiment of the present invention.

Also, it is possible for the lamp unit 300 and the photodetector 400 to be mounted on a moving head 230 as shown in FIG. 12. In this case, the moving head 230 moves the lamp unit 300 and the photodetector 400 so as to permit the photodetector 400 to detect the light beam reflected from the surface of the substrate 110. The moving direction in this stage is substantially parallel to the printing surface having the print contents 150 of the printed matter 100 printed thereon. In this case, it is unnecessary to set the transfer direction 220 in a manner to permit the photodetector 400 to detect and measure the light beam reflected from the surface of the substrate 110. In other words, it suffices for the printed matter 100 and the photodetector 400 to be moved relative to each other so as to permit the printed matter 100 to be scanned by the photodetector 400.

Further, the discriminating apparatus according to the first embodiment of the present invention is directed to the discrimination of the printed matter on a reddish purple substrate. Also, the discriminating apparatus according to the second embodiment of the present invention is directed to the discrimination of the printed matter on a yellow substrate. However, it is also possible to use in combination the constructions for discriminating the printed matter on substrates of other colors. Also, the discriminating apparatus according to the embodiments of the present invention is directed to an example of discriminating a reproduction having reddish purple or yellow dots printed thereon. However, a reproduction having dots, mesh lines or universal lines printed thereon can also be discriminated by using the similar construction.

As described above, the present invention provides a discriminating apparatus, which permits the discrimination at high speed as to whether the printed matter is the original or a reproduction, and which is low in the possibility of erroneous discrimination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for discriminating a reproduction printed matter from an original printed matter, the original printed matter having a first surface area including a blank substrate region having no print, and the reproduction printed matter having a second surface area including a printed region which has a print pattern that causes the printed region to appear the same as the blank substrate region, comprising:

a transfer device configured to transfer one of the original and reproduction printed matters;

a light source configured to project a light beam to one of the first and second surface areas to scan the one of the first and second surface areas with the light beam;

a detector configured to detect an intensity of the light beam reflected from the one of the first and second surface areas to generate an output signal including an output component reflected from one of the blank substrate region and the printed region; and a discriminating unit configured to discriminate whether the one of the original and reproduction printed matters is an original printed matter or not by determining whether the one of the first and second surface areas is a first surface area having no print, or not, based on an amplitude of the output component.

2. The apparatus according to claim 1, wherein the discriminating unit determines an index denoting the nonuniformity in the output component and discriminates the one of the original and reproduction printed matters by comparing the index with a predetermined threshold value.

3. The apparatus according to claim 2, wherein the index is provided by a difference between the maximum value and minimum value of the output values that are sampled from the output component a prescribed number of times and at a predetermined pitch.

4. The apparatus according to claim 3, wherein the index is obtained from the maximum value (Amax) and the minimum value (Amin) of the output values that are sampled from the output component the prescribed number of times and at the predetermined pitch by the formula given below:

$$(Amax-Amin)/(Amax+Amin).$$

5. The apparatus according to claim 3, wherein the index is provided by one or a combination of an arithmetic average roughness, a maximum height, a 10 points average roughness, and a square average roughness, which are obtained from a measuring curve of the output component.

6. The apparatus according to claim 1, wherein the light source is configured to emit a green light beam having a wavelength of 520 to 535 nm or a blue light beam having a wavelength of 400 to 500 nm.

7. The apparatus according to claim 1, wherein the detector further includes an optical filter transmitting selectively a green light beam alone having a wavelength of 520 to 535 nm or a blue light beam alone having a wavelength of 400 to 500 nm.

8. The apparatus according to claim 1, wherein the detector detects the light beam reflected from a region having a diameter of 6.75 to 125 μm on the one of the first and second surface areas.

9. The apparatus according to claim 1, further comprising a selecting device configured to classify the one of the original and reproduction printed matters into the original printed matter or the reproduction printed matter and separately discharging the reproduction from the original.

10. An apparatus for discriminating a reproduction printed matter from an original printed matter, the original printed matter having a first surface area including a blank substrate region having no print, and the reproduction printed matter having a second surface area including a printed region that has a print pattern that causes the printed region to appear the same as the blank substrate region, comprising:

a light source configured to project a light beam to one of the first and second surface areas;

a detector configured to detect an intensity of the light beam reflected from the one of the first and second surface areas to generate an output signal;

a moving mechanism configured to relatively move the detector and the one of the original and reproduction printed matters to scan the one of the first and second surface areas with the detector so that the output signal includes an output component reflected from one of the blank substrate region and the printed region; and a discriminating unit configured to discriminate whether the one of the original and reproduction printed matters is an original printed matter or not by determining whether the one of the first and second surface areas is a first surface area having no print, or not, based on an amplitude of the output component.

11. The apparatus according to claim 10, wherein the discriminating unit determines an index denoting the nonuniformity in the output component and discriminates the one of the original and the reproduction printed matters by comparing the index with a predetermined threshold value.

12. The apparatus according to claim 11, wherein the index is provided by a difference between the maximum value and the minimum value of output values that are sampled from the output component a prescribed number of times and at a predetermined pitch.

13. The apparatus according to claim 11, wherein the index is obtained from the maximum value (Amax) and the minimum value (Amin) of the output values that are sampled from the output components the prescribed number of times and at the predetermined pitch by the formula given below:

$$(Amax-Amin)/(Amax+Amin).$$

14. The apparatus according to claim 11, wherein the index is provided with one or a combination of an arithmetic average roughness, a maximum height, a 10 points average roughness, and a square average roughness, which are obtained from a measuring curve of the output components.

15. The apparatus according to claim 10, wherein the light source is configured to emit a green light beam having a wavelength of 520 to 535 nm or a blue light beam having a wavelength of 400 to 500 nm.

16. The apparatus according to claim 10, wherein the detector further includes an optical filter transmitting selectively a green light beam alone having a wavelength of 520 to 535 nm or a blue light beam alone having a wavelength of 400 to 500 nm.

17. The apparatus according to claim 10, wherein the detector detects the light beam reflected from a region having a diameter of 6.75 to 125 μm on the one of the first and second surface areas.

18. The apparatus according to claim 10, further comprising a selecting device configured to classify the one of the original and reproduction printed matters into the original printed matter and the reproduction printed matter and separately discharge the reproduction from the original.

* * * * *